United States Patent
Hsu et al.

(10) Patent No.: US 8,143,551 B2
(45) Date of Patent: Mar. 27, 2012

(54) METHOD FOR MAKING BACKLIGHT MODULE FRAME

(75) Inventors: Tung-Ming Hsu, Taipei Hsien (TW); Chien-Min Chen, Taipei Hsien (TW); Ming-Fu Hsu, Taipei Hsien (TW); Hsiang-Feng Teng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 827 days.

(21) Appl. No.: 12/241,023

(22) Filed: Sep. 29, 2008

(65) Prior Publication Data

US 2009/0239438 A1    Sep. 24, 2009

(30) Foreign Application Priority Data

Mar. 21, 2008 (CN) .......................... 2008 1 0300655

(51) Int. Cl.
*B23K 26/00* (2006.01)
(52) U.S. Cl. .......... 219/121.64; 219/121.63; 219/121.85
(58) Field of Classification Search ............. 219/121.64, 219/121.63, 121.85; 349/58
See application file for complete search history.

(56) References Cited

U.S. PATENT DOCUMENTS

| | | | | |
|---|---|---|---|---|
| 5,239,157 A | * | 8/1993 | Sakano et al. | 219/121.64 |
| 7,178,968 B2 | * | 2/2007 | Sugahara et al. | 362/633 |
| 7,369,189 B2 | * | 5/2008 | Chieh | 349/58 |

FOREIGN PATENT DOCUMENTS

| | | | |
|---|---|---|---|
| EP | 305352 | | 3/1989 |
| JP | 2001249619 A | * | 9/2001 |
| TW | 200520667 A | | 6/2005 |
| TW | I252727 | | 4/2006 |
| TW | 200720748 A | | 6/2007 |

* cited by examiner

*Primary Examiner* — M. Alexandra Elve
(74) *Attorney, Agent, or Firm* — Altis Law Group, Inc.

(57) ABSTRACT

An exemplary method for making backlight module frames includes: method includes: providing a first metallic sheet and a second metallic sheet, each of the first and second metallic sheets having at least two L-shaped portions connected side by side and oriented in the same direction; welding the two metallic sheets to form a plurality of connected semi-manufactured frames corresponding to s subsequent backlight module frame; and pressing the connected semi-manufactured frames to form a plurality of backlight module frames. The method costs less welding time and it is convenient for the backlight module frames to be mass-produced.

16 Claims, 5 Drawing Sheets

METHOD FOR MAKING BACKLIGHT MODULE FRAME

BACKGROUND

1. Technical Field

The present disclosure relates to a method for making a backlight module frame. The method is particularly used in the production of backlight module for a liquid crystal display (LCD) device.

2. Description of the Related Art

A typical LCD device comprises an LCD panel, and a backlight module mounted under the LCD panel for supplying light thereto. The backlight module mainly comprises a light source, a light guide plate, and a frame. The light guide plate is made of a transparent acrylic plastic, and is used for guiding light received from the light source to uniformly illuminate the liquid crystal display panel. The frame is usually made of metal, and used for providing a high mechanical strength to protect the light guide plate and the light source. The frame also provides an electromagnetic shield capability.

A typical method of making a backlight module frame includes: providing a number of individual starting components that are cut to proper length; pressing the starting components to form a unit corresponding to the subsequent unit form of the frame; assembling the units to form a semi-manufactured frame corresponding to the subsequent form of the frame; and welding the semi-manufactured frame to manufacture a backlight module frame. This method of making a backlight module frame may lower the cost of material. However, forming each one of the backlight module frames needs at least two welding processes. The more welding processes of making the backlight module frame, the more time is relatively needed, which is problematic for mass-producing the backlight module frames.

What is needed, therefore, is a new method for making backlight module frames that overcomes the above mentioned disadvantages.

SUMMARY

The present disclosure provides a method for making a backlight module frame. The method includes: providing a first metallic sheet and a second metallic sheet, each of the first and second metallic sheets having at least two L-shaped portions connected side by side; welding the two metallic sheets to form a plurality of connected semi-manufactured frames corresponding to the subsequent backlight module frame; and pressing the connected semi-manufactured frames to form a plurality of backlight module frames.

Other advantages and novel features will become more apparent from the following detailed description of preferred embodiments when taken in conjunction with the accompanying drawings.

BRIEF DESCRIPTION OF THE DRAWINGS

Many aspects of the method for making a backlight module frame can be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

DETAILED DESCRIPTION OF THE PREFERRED EMBODIMENTS

Figure 1:
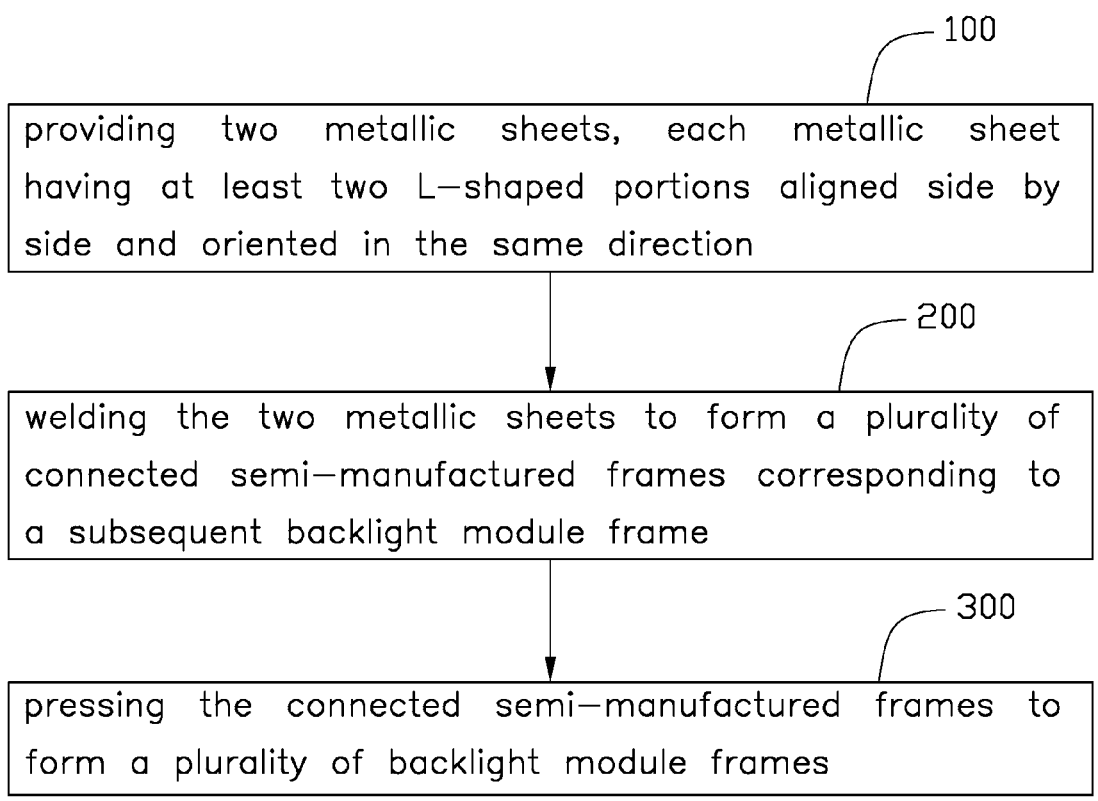
FIG. 1 is a flowchart of a method for making a backlight module frame according to an exemplary embodiment of the disclosure.
Figure 2:
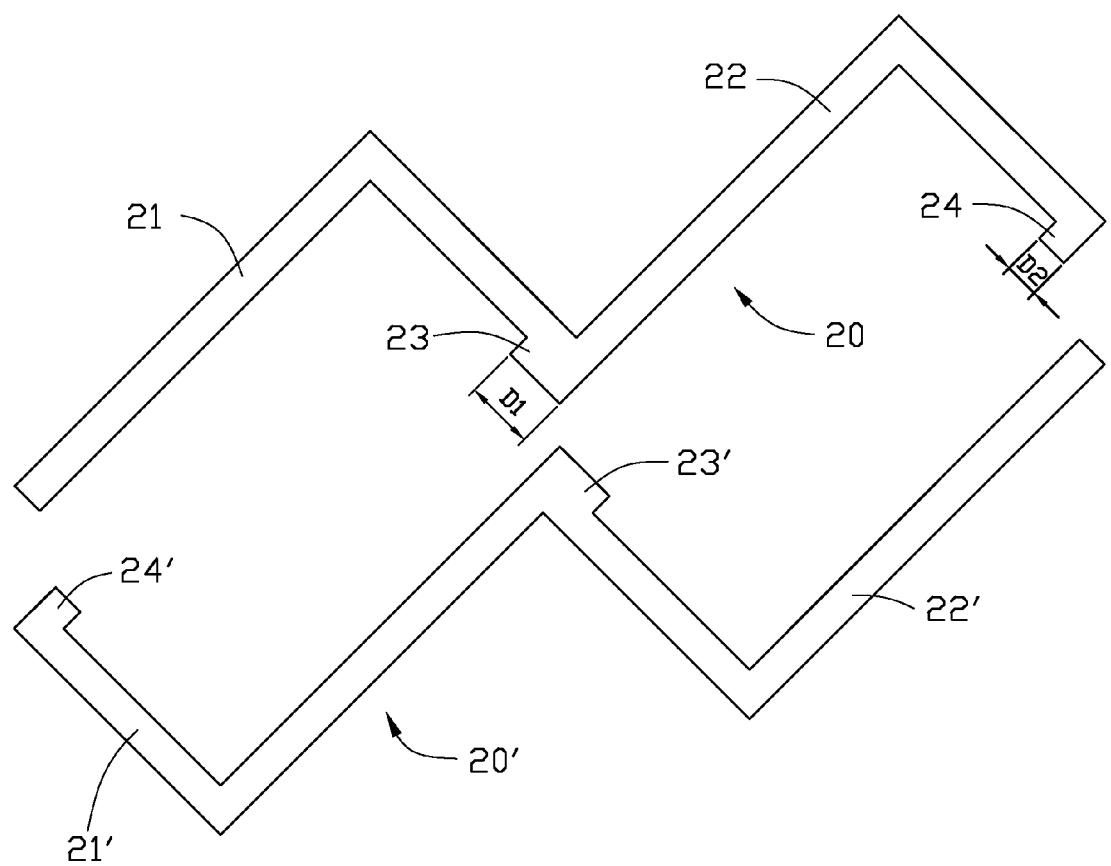
FIG. 2 is a schematic, top plan view of two metallic sheets, each metallic sheet having two L-shaped portions to be welded together.
Figure 3:
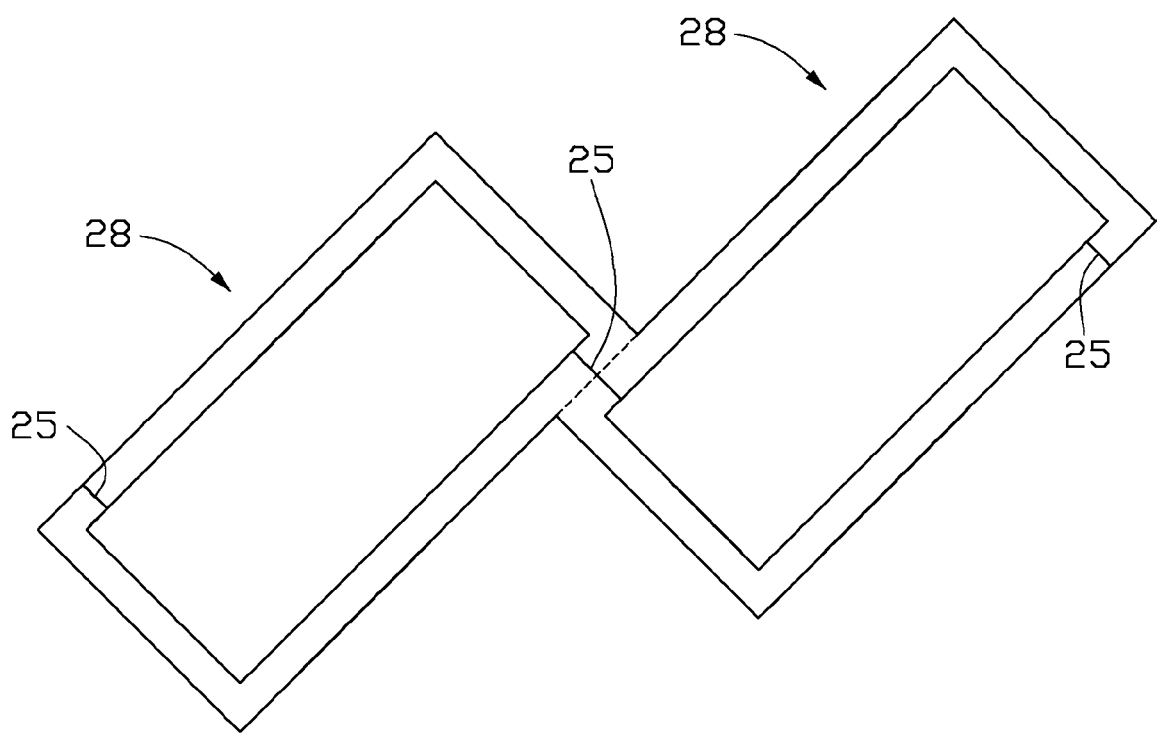
FIG. 3 is a schematic, top plan view of the two metallic sheets shown in FIG. 2, the two metallic sheets welded to form two connected semi-manufactured frames.

FIG. 1 is a flowchart of a method for making backlight module frame in accordance with a first exemplary embodiment. Referring to FIGS. 1 through 3 together, the method includes performing the following:

Step 100: providing two metallic sheets 20, 20', each metallic sheet having two L-shaped portions, i.e., the metallic sheet 20 having a first L-shaped portion 21 and a second L-shaped portion 22, aligned side by side; the metallic sheet 20' having a first L-shaped portion 21' and a second L-shaped portion 22', aligned side by side;

Step 200: welding the two metallic sheets 20, 20' to form two connected semi-manufactured frames 28 corresponding to a subsequent backlight module frame; and Step 300: pressing the two connected semi-manufactured frames 28 to form two backlight module frames.

In the step 100, the metallic sheet 20 includes a first L-shaped portion 21, and a second L-shaped portion 22 with one end connected to an end of the first L-shaped portion 21. The two L-shaped portions are oriented in the same direction. Each of the first and second L-shaped portions 21, 22 is substantially a half of the frame body of the subsequent backlight module frame. The metallic sheet 20 defines a larger protrusion 23 formed at the connecting ends of L-shaped portions and extending from an end of the first L-shaped portion 21 away from the second L-shaped portion 22, and a smaller protrusion 24 extending from a distal end of the second L-shaped portion 22. The metallic sheet 20' includes a first L-shaped portion 21' and a second L-shaped portion 22'. It is formed similarly to the component 20, but shaped as if the component 20 were first flipped over and then mirrored. The metallic sheet 20' defines a larger protrusion 23' extending from an end of the second L-shaped portion 22' away from the first L-shaped portion 21', and a smaller protrusion 24' extending from a distal end of the first L-shaped portion 21'. The metallic sheets 20, 20' may be produced with single pieces punched from a metal sheet. In this embodiment, widths of the first L-shaped portions 21, 21' and the second L-shaped portions 22, 22' of the metallic sheets 20, 20' are the same. A width D1 of the larger protrusions 23, 23' equals twice of that of the subsequent backlight module frame, and a width D2 of the smaller protrusion 24, 24' equals that of the subsequent backlight module frame.

In the step 200, when the metallic sheets 20, 20' are assembled together, three welding portions 25 are welded by a welding apparatus (not shown) to form two semi-manufactured frames 28 of the subsequent backlight module frame. Referring to FIGS. 2 and 3 again, the larger protrusions 23, 23' of the two metallic sheets 20, 20' contact with each other. The smaller protrusions 24, 24' of the two metallic sheets 20, 20' are in contact with distal ends of the second L-shaped portion 22' and the first L-shaped portion 21 respectively. A connecting portion of the two semi-manufactured frames 28 is located at a part of one of side frames of the two semi-manufactured frames 28, and the welding portion 25 is located at a range of the connecting portion of the two semi-manufactured frames 28.

The welding apparatus is selected from a group consisting of a $CO_2$ high performance laser and an Nd-YAG laser. The wielding apparatus may have a control interface that allows external programming and setting the laser power cycles, pulse programs, pulse frequency, and laser power. In an analog laser power control that is controlled directly by a computerized numerical control, one has the ability to control the laser power's path-dependency, rate-dependency, time-dependency or laser power levels. When utilizing the laser beam to weld the starting components together, the heat areas adjacent to the edges of the starting components are small, thus, resulting individual weld seams produced by the laser beam are significantly small. Furthermore, the size of the semi-manufactured frame may not be affected in a significant way due to the laser welding process. In addition, the semi-manufactured frame will have a smooth surface without producing any protruding weld seams thereon due to the laser welding process.

The connected semi-manufactured frames has smooth surfaces and enough mechanical strength to undergo a pressing process. Before welding, end surfaces of the welding portions 25 of the two metallic sheets 20, 20' should be polished thoroughly. Polishing allows the two metallic sheets 20, 20' to connect tightly and increase the laser welding effectiveness.

In step 300, the two semi-manufactured frames 28 may be pressed by a pressing machine to form two backlight module frames according to a backlight frame design.

In the first embodiment, forming two backlight module frames only needs three welding processes, one less welding process is performed than a conventional method described in background, and thus, requiring less welding time. In addition, it is convenient for the backlight module frames to be mass-produced.

Figure 4:
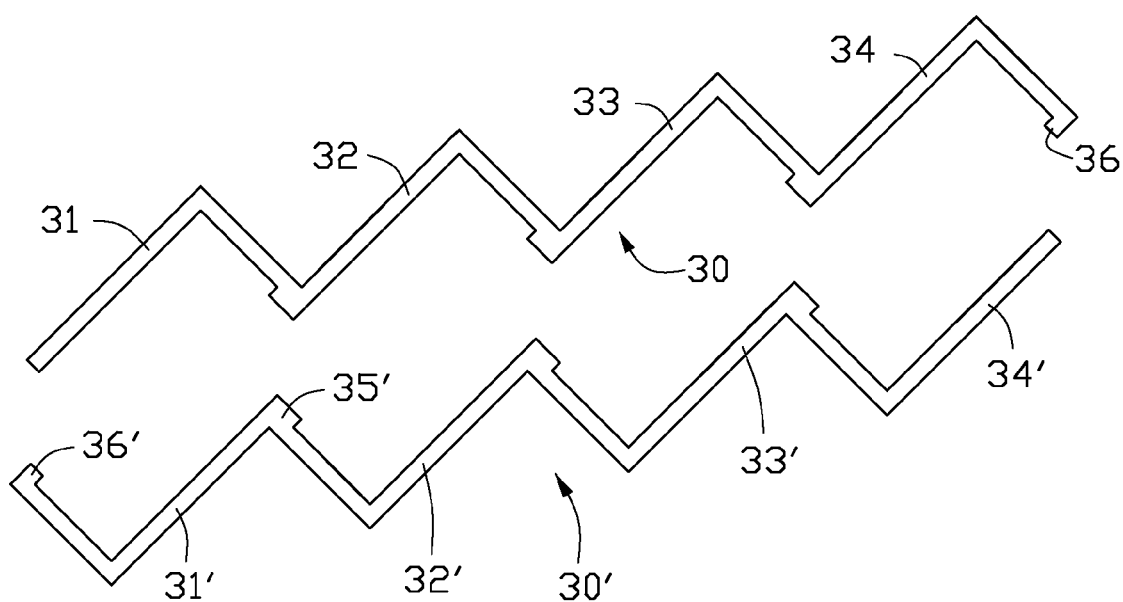
FIG. 4 is a schematic, top plan view of two metallic sheets, each metallic sheet having four L-shaped portions to be welded together.
Figure 5:
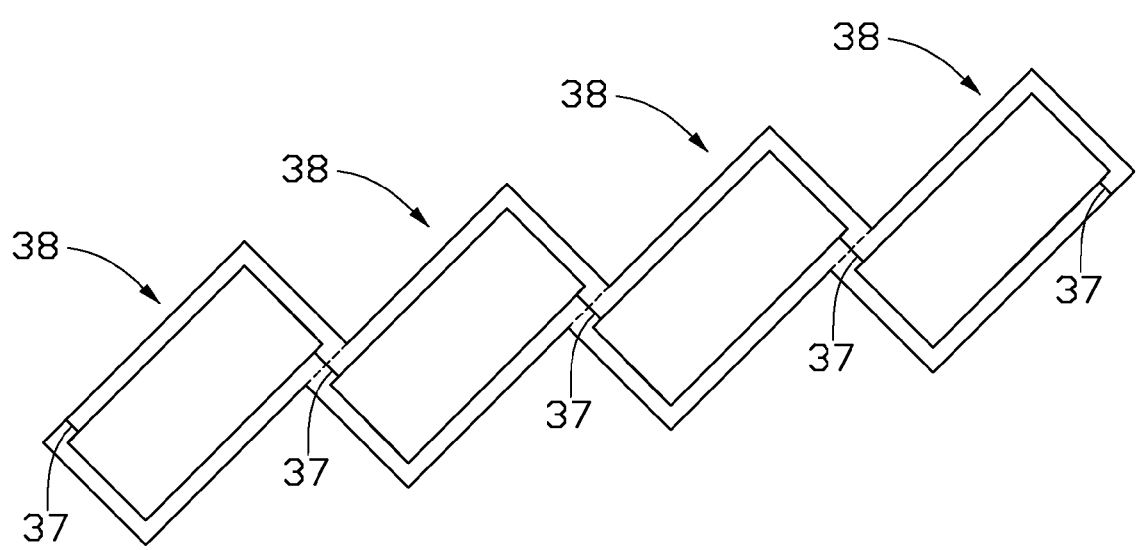
FIG. 5 is a schematic, top plan view of the two metallic sheets shown in FIG. 4, the two metallic sheets welded to form four connected semi-manufactured frames.

Referring to FIGS. 4 and 5 together, a method for making backlight module frame in accordance with a second exemplary embodiment, includes performing the following:

Providing two metallic sheets 30, 30', each metallic sheet having four L-shaped portions, i.e., the metallic sheets 30 having a first L-shaped portion 31, a second L-shaped portion 32, a third L-shaped portion 33 and a fourth L-shaped portion 34 aligned side by side; and the metallic sheets 30' having a first L-shaped portion 31', a second L-shaped portion 32', a third L-shaped portion 33' and a fourth L-shaped portion 34' aligned side by side;

Welding the two metallic sheets 30, 30' to form four connected semi-manufactured frames 38 corresponding to the subsequent backlight module frame; and Pressing the four connected semi-manufactured frames 38 to form four backlight module frames.

The metallic sheet 30 defines three larger protrusions 35 extending from an end of the first L-shaped portion 31, the second L-shaped portion 32, and the third L-shaped portion 33 away from the four L-shaped portion 34 respectively, and a smaller protrusion 36 extending from a distal end of the four L-shaped portion 34.

The metallic sheet 30' defines three larger protrusions 35' extending from an end of the second L-shaped portion 32', the third L-shaped portion 33', and the four L-shaped portion 34' away from the first L-shaped portion 31' respectively, and a smaller protrusion 36' extending from a distal end of the first L-shaped portion 31'.

Referring to FIG. 5 again, when the two metallic sheet 30, 30' is assembled together, five welding portions 37 should be welded by a welding apparatus (not shown) to form four semi-manufactured frames of the subsequent backlight module frame. In this embodiment, forming four backlight module frames only needs five welding processes. Three less welding processes are performed than a conventional method described in background, and thus it costs less welding time.

It should be pointed out that, the smaller protrusion 24, 24', 36, 36' of the metallic sheets can be omitted, as long as the two first L-shaped portions, or the last L-shaped portions of the two metallic sheets can cooperatively define a frame shape.

Finally, while the present disclosure has been described with reference to particular embodiments, the description is illustrative of the disclosure and is not to be construed as limiting the disclosure. Therefore, various modifications can be made to the embodiments by those skilled in the art without departing from the true spirit and scope of the disclosure as defined by the appended claims.

What is claimed is:

1. A method for making backlight module frames, the method comprising:
providing a first metallic sheet and a second metallic sheet, each of the first and second metallic sheets having at least two L-shaped portions connected side by side and oriented in the same direction, and two adjacent L-shaped portions of the at least two L-shaped portions form a substantially M-shaped sheet;
welding the two metallic sheets to form at least two connected semi-manufactured frames corresponding to a subsequent backlight module frame; and
pressing the at least two connected semi-manufactured frames to form a plurality of backlight module frames.

2. The method of claim 1, wherein each of the first and second metallic sheets comprises two L-shaped portions, namely, a first L-shaped portion and a second L-shaped portion connected with the first L-shaped portion; the first L-shaped portion of the first metallic sheet and the first L-shaped portion of the second metallic sheet cooperatively define a first frame unit; the second L-shaped portion of the first metallic sheet and the second L-shaped portion of the second metallic sheet cooperatively define a second frame unit.

3. The method of in claim 2, wherein the first metallic sheet comprises a larger protrusion extending from an end of the first L-shaped portion away from the second L-shaped portion, and a smaller protrusion extending from a distal end of the second L-shaped portion; the second metallic sheet comprises a larger protrusion extending from an end of the second L-shaped portion away from the first L-shaped portion, and a smaller protrusion extending from a distal end of the first L-shaped portion.

4. The method of in claim 3, wherein a width of the larger protrusions of the first and second metallic sheets equals twice of that of the subsequent backlight module frame, and a width of the smaller protrusion of the first and second metallic sheets equals that of the subsequent backlight module frame.

5. The method of claim 3, wherein end surfaces of the larger and smaller protrusions are polished before the welding step.

6. The method of in claim 1, wherein the first and second metallic sheets are produced with single pieces punched from a metal sheet.

7. The method of claim 1, wherein the welding step uses a laser selected from the group consisting of a CO2 gas laser and an Nd: YAG solid-state laser.

8. The method of claim 1, wherein each of the first and second metallic sheets comprises four L-shaped portions, namely, a first L-shaped portion, a second L-shaped portion, a third L-shaped portion, and a fourth L-shaped; the first L-shaped portion of the first metallic sheet and the first L-shaped portion of the second metallic sheet cooperatively define a first frame unit; the second L-shaped portion of the first metallic sheet and the second L-shaped portion of the second metallic sheet cooperatively define a second frame unit; the third L-shaped portion of the first metallic sheet and the third L-shaped portion of the second metallic sheet cooperatively define a third frame unit; the fourth L-shaped portion of the first metallic sheet and the fourth L-shaped portion of the second metallic sheet cooperatively define a fourth frame unit.

9. A method for making backlight module frames, the method comprising:
providing a first metallic sheet and a second metallic sheet, each of the first and second metallic sheets having at least two L-shaped portions connected at distal ends of the L-shaped portion, and two adjacent L-shaped portions of the at least two L-shaped portions form a substantially M-shaped sheet;
assembling the first and second metallic sheets to form at least two frame units, the frame units defining a plurality of connecting portions;
welding the plurality of connecting portions of the frame units to form at least two connected semi-manufactured frames corresponding to a subsequent backlight module frame; and
pressing the at least two connected semi-manufactured frames to form a plurality of backlight module frames.

10. The method of claim 9, wherein each of the first and second metallic sheets comprises two L-shaped portions, namely, a first L-shaped portion and a second L-shaped portion connected with the first L-shaped portion; the first L-shaped portion of the first metallic sheet and the first L-shaped portion of the second metallic sheet cooperatively define a first frame unit; the second L-shaped portion of the first metallic sheet and the second L-shaped portion of the second metallic sheet cooperatively define a second frame unit.

11. The method of in claim 10, wherein the first metallic sheet comprises a larger protrusion extending from an end of the first L-shaped portion away from the second L-shaped portion, and a smaller protrusion extending from a distal end of the second L-shaped portion; the second metallic sheet comprises a larger protrusion extending from an end of the second L-shaped portion away from the first L-shaped portion, and a smaller protrusion extending from a distal end of the first L-shaped portion.

12. The method of in claim 11, wherein a width of the larger protrusions of the first and second metallic sheets equals twice of that of the subsequent backlight module frame, and a width of the smaller protrusion of the first and second metallic sheets equals that of the subsequent backlight module frame.

13. The method of claim 11, wherein end surfaces of the larger and smaller protrusions are polished before the welding step.

14. The method of in claim 9, wherein the first and second metallic sheets are produced with single pieces punched from a metal sheet.

15. The method of claim 9, wherein the welding step uses a laser selected from the group consisting of a CO2 gas laser and an Nd:YAG solid-state laser.

16. The method of claim 9, wherein each of the first and second metallic sheets comprises four L-shaped portions, namely, a first L-shaped portion, a second L-shaped portion, a third L-shaped portion, and a fourth L-shaped portion connected with side by side; the first L-shaped portion of the first metallic sheet and the first L-shaped portion of the second metallic sheet cooperatively define a first frame unit; the second L-shaped portion of the first metallic sheet and the second L-shaped portion of the second metallic sheet cooperatively define a second frame unit; the third L-shaped portion of the first metallic sheet and the third L-shaped portion of the second metallic sheet cooperatively define a third frame unit; the fourth L-shaped portion of the first metallic sheet and the fourth L-shaped portion of the second metallic sheet cooperatively define a fourth frame unit.

\* \* \* \* \*